US012739337B2

(12) United States Patent
Morooka

(10) Patent No.: US 12,739,337 B2
(45) Date of Patent: Sep. 15, 2026

(54) SERVER SYSTEM, STORAGE MEDIUM, AND CONTROL METHOD FOR PERFORMING PRINTING WITH APPLICATION-BASED CHARGING DESTINATION MANAGEMENT

(71) Applicant: CANON KABUSHIKI KAISHA, Tokyo (JP)

(72) Inventor: Hidekazu Morooka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 255 days.

(21) Appl. No.: 18/609,907

(22) Filed: Mar. 19, 2024

(65) Prior Publication Data

US 2024/0323304 A1 Sep. 26, 2024

(30) Foreign Application Priority Data

Mar. 22, 2023 (JP) ................................ 2023-044873

(51) Int. Cl.
*H04N 1/34* (2006.01)
*H04N 1/00* (2006.01)

(52) U.S. Cl.
CPC ......... *H04N 1/342* (2013.01); *H04N 1/00427* (2013.01)

(58) Field of Classification Search
None
See application file for complete search history.

(56) References Cited

U.S. PATENT DOCUMENTS 8,508,766 B2 * 8/2013 Brock ..................... H04L 67/10 705/410
8,730,503 B2 * 5/2014 Gross .................... G06F 9/5038 358/1.14
11,698,765 B2 * 7/2023 Abe ...................... G06F 3/1204 358/1.15
2006/0044597 A1 * 3/2006 Dumitrescu ....... H04N 1/00432 358/1.6
2007/0091355 A1 * 4/2007 Rai ...................... G06F 3/1275 709/201
2009/0066996 A1 * 3/2009 Minowa ................... G07G 5/00 358/1.15

(Continued)

FOREIGN PATENT DOCUMENTS

JP 2014049059 A 3/2014

*Primary Examiner* — Pawan Dhingra
(74) *Attorney, Agent, or Firm* — Canon U.S.A., Inc. IP Division

(57) ABSTRACT

A server system includes one or more memories that store instructions, and one or more processors that execute the instructions to perform registration processing for registering names of a plurality of applications and charging destinations of the applications designated in a client terminal in association with each other, transmit, to the client terminal, information about a first user interface for prompting a user to select a name of an application of a file to be printed among the registered names of the plurality of applications, receive the name of the application selected on the first user interface and the file to be printed from the client terminal, and perform charging processing to a charging destination registered in association with the received name of the application based on printing of the file to be printed.

13 Claims, 17 Drawing Sheets

(56) References Cited

U.S. PATENT DOCUMENTS

2009/0180141 A1* 7/2009 Takaishi ............. G03G 15/5075 358/1.15
2011/0019821 A1* 1/2011 Kino ...................... H04N 1/344 380/255
2012/0147412 A1* 6/2012 Tsujimoto ............. G06F 3/1239 358/1.14
2014/0067456 A1* 3/2014 Kashida ........... G06Q 10/06315 705/7.25

* cited by examiner

FIG.1

100 CLIENT TERMINAL

INTERNET

110 CLOUD PRINT SERVICE

120 IMAGE FORMING APPARATUS

130 IMAGE FORMING APPARATUS

200
CLIENT TERMINAL
INTERNET
210
CLOUD PRINT SERVICE (VIRTUAL PRINTER SERVICE)
220
CLOUD PRINT SERVICE
INTERNAL TENANT
221
CLOUD PRINT SERVICE
SHARED OFFICE TENANT
222
CLOUD PRINT SERVICE
CONVENIENCE STORE TENANT
230
IMAGE FORMING APPARATUS
231
IMAGE FORMING APPARATUS
232
IMAGE FORMING APPARATUS
233
IMAGE FORMING APPARATUS

FIG.3
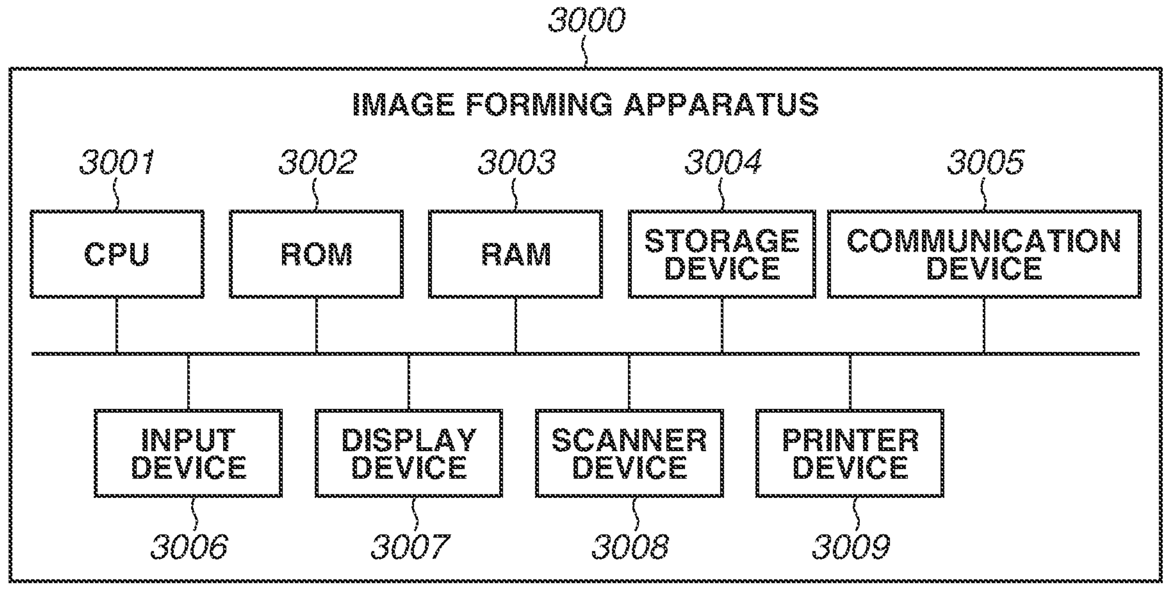
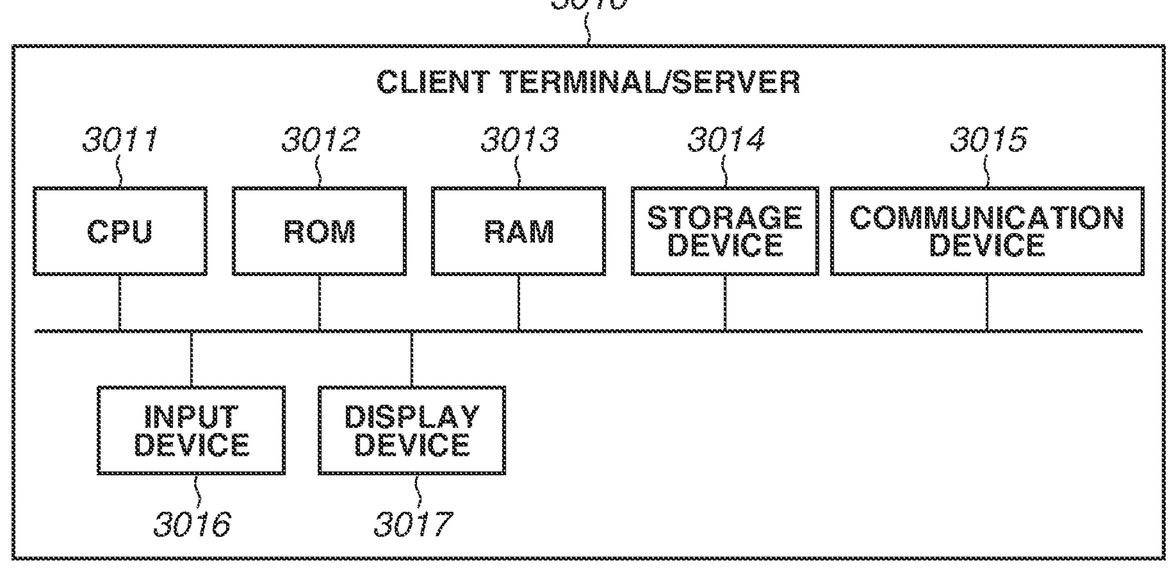

FIG.5

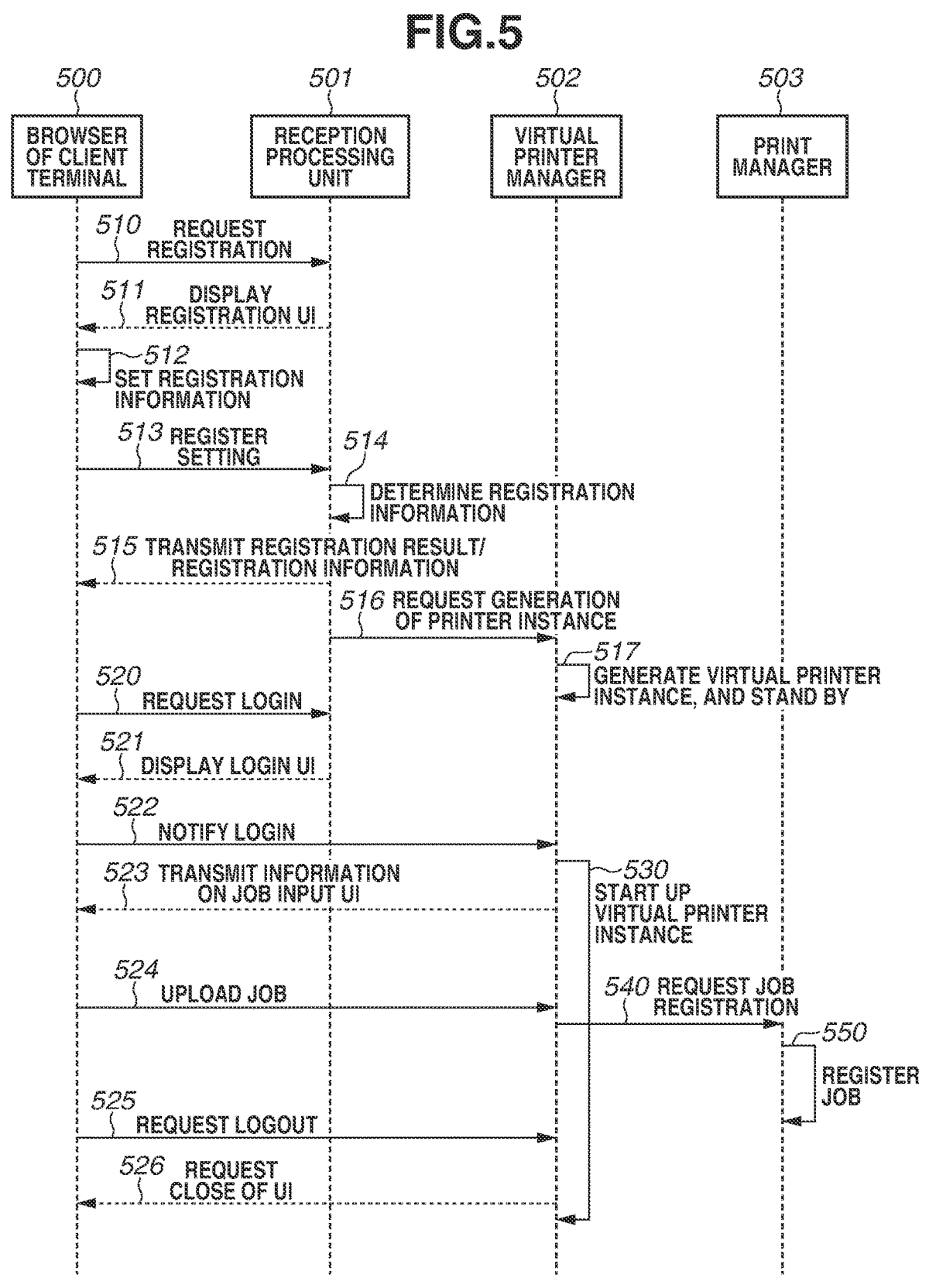

500 BROWSER OF CLIENT TERMINAL
501 RECEPTION PROCESSING UNIT
502 VIRTUAL PRINTER MANAGER
503 PRINT MANAGER

510 REQUEST REGISTRATION
511 DISPLAY REGISTRATION UI
512 SET REGISTRATION INFORMATION
513 REGISTER SETTING
514 DETERMINE REGISTRATION INFORMATION
515 TRANSMIT REGISTRATION RESULT/ REGISTRATION INFORMATION
516 REQUEST GENERATION OF PRINTER INSTANCE
517 GENERATE VIRTUAL PRINTER INSTANCE, AND STAND BY
520 REQUEST LOGIN
521 DISPLAY LOGIN UI
522 NOTIFY LOGIN
523 TRANSMIT INFORMATION ON JOB INPUT UI
530 START UP VIRTUAL PRINTER INSTANCE
524 UPLOAD JOB
540 REQUEST JOB REGISTRATION
550 REGISTER JOB
525 REQUEST LOGOUT
526 REQUEST CLOSE OF UI

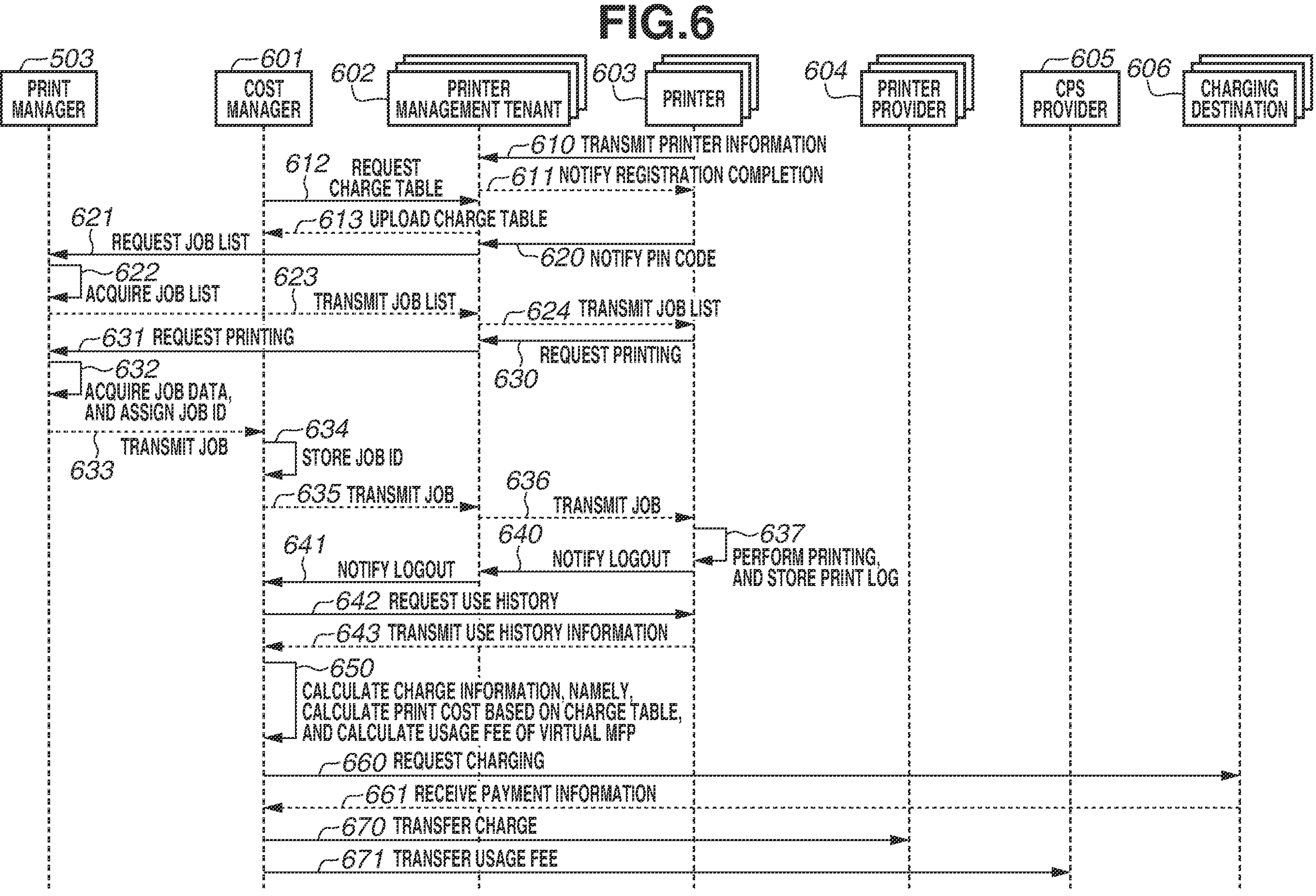
FIG.6
503 PRINT MANAGER
601 COST MANAGER
602 PRINTER MANAGEMENT TENANT
603 PRINTER
604 PRINTER PROVIDER
605 CPS PROVIDER
606 CHARGING DESTINATION
610 TRANSMIT PRINTER INFORMATION
612 REQUEST CHARGE TABLE
611 NOTIFY REGISTRATION COMPLETION
613 UPLOAD CHARGE TABLE
621 REQUEST JOB LIST
620 NOTIFY PIN CODE
622 ACQUIRE JOB LIST
623 TRANSMIT JOB LIST
624 TRANSMIT JOB LIST
631 REQUEST PRINTING
REQUEST PRINTING 630
632 ACQUIRE JOB DATA, AND ASSIGN JOB ID
TRANSMIT JOB 633
634 STORE JOB ID
635 TRANSMIT JOB
636 TRANSMIT JOB
637 PERFORM PRINTING, AND STORE PRINT LOG
641 NOTIFY LOGOUT
640 NOTIFY LOGOUT
642 REQUEST USE HISTORY
643 TRANSMIT USE HISTORY INFORMATION
650 CALCULATE CHARGE INFORMATION, NAMELY, CALCULATE PRINT COST BASED ON CHARGE TABLE, AND CALCULATE USAGE FEE OF VIRTUAL MFP
660 REQUEST CHARGING
661 RECEIVE PAYMENT INFORMATION
670 TRANSFER CHARGE
671 TRANSFER USAGE FEE

FIG.7

| | A5 | A4 | A3 | . . . | COLOR | STAPLE | PUNCH |
|---|---|---|---|---|---|---|---|
| TENANT A (INTERNAL TENANT) | 5 YEN | 9 YEN | 20 YEN | | 5 YEN | 10 YEN | 5 YEN |
| TENANT B (SHARED OFFICE TENANT) | 5 YEN | 10 YEN | 20 YEN | | 5 YEN | 10 YEN | 5 YEN |
| TENANT C (CONVENIENCE STORE TENANT) | 6 YEN | 10 YEN | 22 YEN | | 10 YEN | 10 YEN | 10 YEN |
| . . . | | | | | | | |

FIG.8

· USER INFORMATION

| | | |
|---|---|---|
| AUTHENTICATION INFORMATION | LOGIN ID | AAA |
| | PASSWORD | BBB |
| SETTLEMENT INFORMATION | CREDIT CARD INFORMATION | 1111-2222-3333-4444 |

· WORK SETTING

| APPLICATION | CHARGING DESTINATION | PRINT SETTING | |
|---|---|---|---|
| COMPANY A PATENT WORK | COMPANY A | DOUBLE-SIDED, STAPLE AT UPPER LEFT | |
| COMPANY B WORK | COMPANY B | PUNCH | |
| PRIVATE USE | USER | DOUBLE-SIDED | |
| ... | ... | ... | |

FIG.10

| PIN CODE | WORK APPLICATION | JOB INFORMATION | JOB SIZE | JOB ID |
|---|---|---|---|---|
| 9999 | COMPANY A PATENT WORK | PATENT LIST.pdf | 100 M | JobID-100991 |
| 9999 | PRIVATE USE | PERSONAL ACTION LIST.pdf | 10 M | JobID-100992 |
| 9999 | COMPANY B WORK | DEPOSIT SLIP.doc | 0.5 M | JobID-100993 |

FIG.11

· USER INFORMATION

| | | |
|---|---|---|
| AUTHENTICATION INFORMATION | LOGIN ID | AAA |
| | PASSWORD | BBB |
| SETTLEMENT INFORMATION | ☐ REGISTER CREDIT CARD INFORMATION | |

· WORK SETTING

| APPLICATION | CHARGING DESTINATION | PRINT SETTING |
|---|---|---|
| WORK A1 | COMPANY A | 2 IN 1 |
| WORK A2 | COMPANY A | PUNCH |
| WORK B | COMPANY B | STAPLE: UPPER LEFT |
| PRIVATE USE | USER | DOUBLE-SIDED |
| ... | ... | ... |

FIG.14

| JOB ID | A5 | A4 | A3 | ... | COLOR | STAPLE | PUNCH |
|---|---|---|---|---|---|---|---|
| JobID-199906 | 3 | 0 | 0 | ... | 1 | 0 | 1 |
| JobID-100991 | 0 | 75 | 0 | ... | 0 | 1 | 0 |
| JobID-220982 | 0 | 0 | 2 | ... | 0 | 0 | 0 |
| ... | | | | | | | |

FIG.15

| PRINT DATA SIZE | 1 M | 10 M | 100 M | ... |
|---|---|---|---|---|
| CHARGE | 0.5 YEN | 10 YEN | 20 YEN | ... |

FIG.16

| | CHARGE ACQUISITION MEANS | A5 | A4 | A3 | . . . | COLOR | STAPLE | PUNCH |
|---|---|---|---|---|---|---|---|---|
| TENANT A | ELECTRONIC SETTLEMENT | 5 YEN | 9 YEN | 20 YEN | . . . | 5 YEN | 10 YEN | 5 YEN |
| TENANT B | ELECTRONIC SETTLEMENT | 5 YEN | 10 YEN | 20 YEN | . . . | 5 YEN | 10 YEN | 5 YEN |
| TENANT C | CASH, ELECTRONIC SETTLEMENT | 6 YEN | 10 YEN | 22 YEN | . . . | 10 YEN | 11 YEN | 7 YEN |
| . . . | | | | | | | | |

FIG.17

| PIN CODE | PRINT APPLICATION | CHARGE INFORMATION | JOB NAME | JOB SIZE | JOB ID | DETERMINATION |
|---|---|---|---|---|---|---|
| 9999 | PRIVATE USE | NOT REGISTERED | PERSONAL ACTION LIST.pdf | 10 M | JobID-199906 | PRINTABLE |
| 9999 | COMPANY B WORK | NOT REGISTERED | DEPOSIT SLIP.doc | 0.5 M | JobID-100993 | PRINTABLE |

SERVER SYSTEM, STORAGE MEDIUM, AND CONTROL METHOD FOR PERFORMING PRINTING WITH APPLICATION-BASED CHARGING DESTINATION MANAGEMENT

BACKGROUND

Field

The present disclosure relates to a server system, a non-transitory storage medium, and a control method for performing printing.

Description of the Related Art

In recent years, a cloud print service in which a print job is input to an image forming apparatus via a cloud and the image forming apparatus prints the print job has started to become common. FIG. 1 illustrates a system configuration of the cloud print service. Before a user uses the cloud print service, an administrator of image forming apparatuses 120 and 130 registers the image forming apparatuses 120 and 130 to a tenant of a cloud print service 110. The user using the cloud print service 110 downloads a printer driver from the cloud print service 110, and registers a client terminal 100 used by the user to the tenant. As a result, a print job can be transmitted from the client terminal 100 to the image forming apparatuses 120 and 130 via the cloud print service 110. With this configuration, the print job transmitted from the client terminal 100 can be performed by any of the image forming apparatuses 120 and 130 registered to the tenant. This provides an advantage of increasing flexibility of a place where the user performs printing.

On the other hand, the user wants to perform printing while working from home in some cases. In a technique discussed in Japanese Patent Application Laid-Open No. 2014-49059, in a case where the user wants to perform printing using a printer installed at home, the user selects whether the printing is for private use or for official use in a print setting screen for when selecting a file to be printed and making print settings displayed on an information processing terminal. In a case where the printing for official use (for work use) is selected, only use amount logs relating to the printing for official use are collected to calculate a printing cost, and a bearer of the printing cost is set to a place of employment of the user.

Further, in recent years, the number of users who belong to a plurality of companies and perform work of respective companies (i.e., users who hold multiple jobs) is increasing. Such a user performs work of one company in a spare time of work of another company. Further, diversification of working places increases opportunities for the user to perform printing in a plurality of different printing environments, such as an office, a shared office, a home, and a convenience store.

In the above-described technique discussed in Japanese Patent Application Laid-Open No. 2014-49059, however, only the printings for private use and work use are distinguished, and it is not possible to easily distinguish among printings for work of different companies when the user belongs to a plurality of companies.

SUMMARY

According to an aspect of the present disclosure, a server system includes one or more memories that store instructions, and one or more processors that execute the instructions to perform registration processing for registering names of a plurality of applications and charging destinations of the applications designated in a client terminal in association with each other, transmit, to the client terminal, information about a first user interface for prompting a user to select a name of an application of a file to be printed among the registered names of the plurality of applications, receive the name of the application selected on the first user interface and the file to be printed from the client terminal, and perform charging processing to a charging destination registered in association with the received name of the application based on printing of the file to be printed.

Further features of the present disclosure will become apparent from the following description of exemplary embodiments with reference to the attached drawings.

BRIEF DESCRIPTION OF THE DRAWINGS

Figure 1:
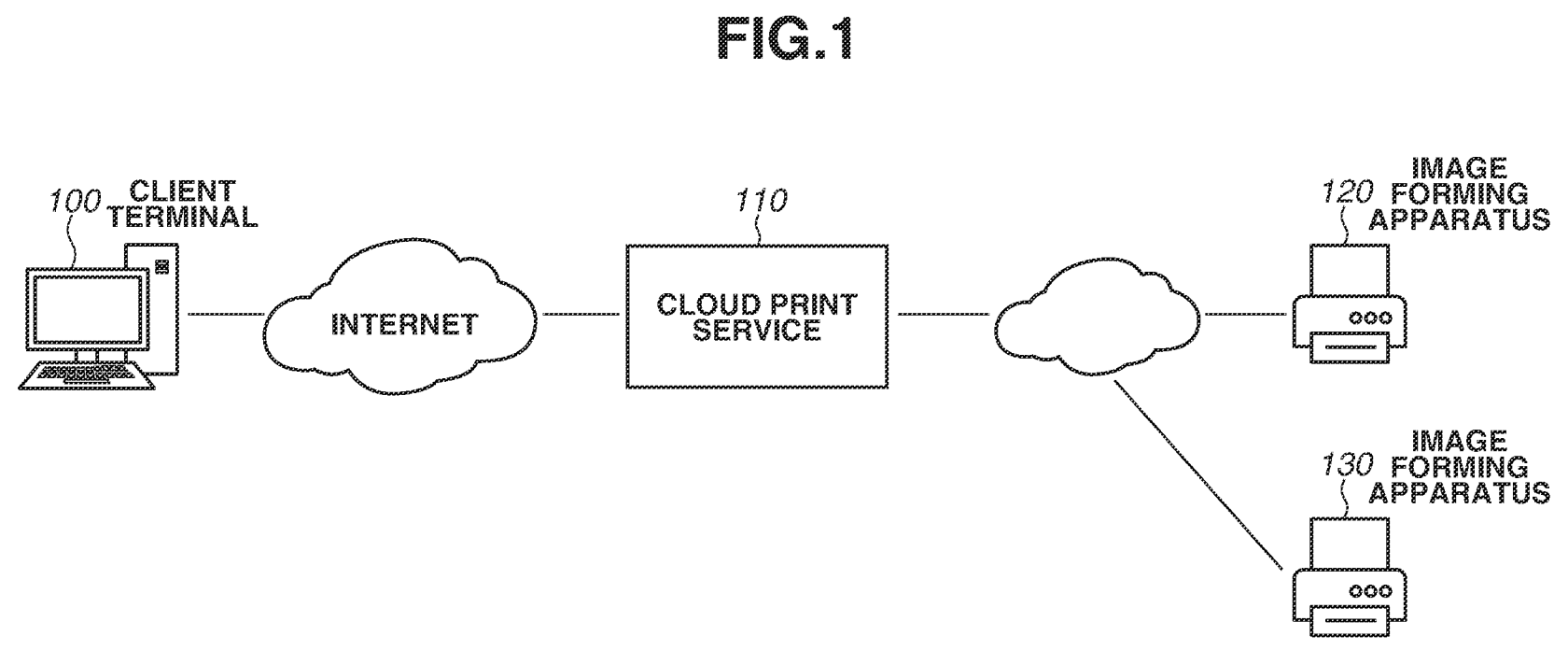

FIG. 1 is a basic configuration diagram of a cloud print system.

FIG. 3 is a hardware configuration diagram.

FIG. 5 is a sequence diagram relating to user registration and job upload.

FIG. 6 is a sequence diagram relating to printing and charging processing.

FIG. 7 illustrates an example of a charge table.

FIG. 8 illustrates an example of registration information (user information and work setting) registered using a registration user interface (UI).

FIG. 10 illustrates an example of a job list.

FIG. 11 illustrates an example of registration information according to a second exemplary embodiment.

FIG. 14 illustrates an example of a print log.

FIG. 15 illustrates an example of a usage fee of a cloud print service (CPS).

FIG. 16 illustrates an example of a charge table according to the second exemplary embodiment.

FIG. 17 illustrates an example of a job list according to the second exemplary embodiment.

DESCRIPTION OF THE EMBODIMENTS

Exemplary embodiments of the present disclosure are described below with reference to the drawings. The following exemplary embodiments do not limit the disclosure according to the claims, and not all of combinations of features described in the exemplary embodiments are necessarily essential for solving means of the disclosure.

Figure 2:
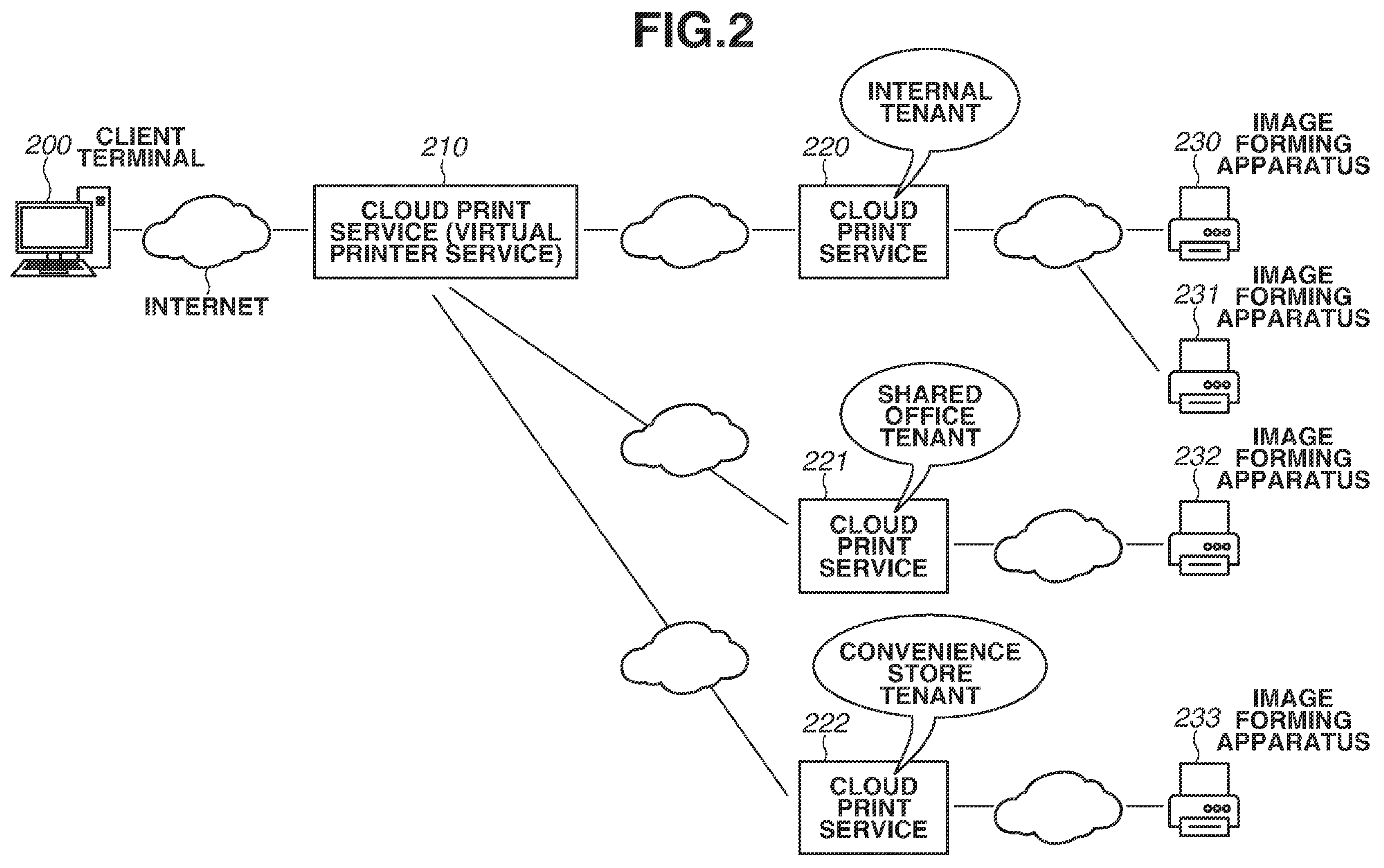
FIG. 2 is a system configuration diagram according to a first exemplary embodiment.

FIG. 2 illustrates a system configuration according to a first exemplary embodiment. A client terminal 200 is a terminal used by a user, and can transmit a print job to a first cloud print service (hereinafter, referred to as first CPS) 210. Image forming apparatuses 230, 231, 232, and 233 can each acquire a print job from respective cloud print services (second CPS) 220, 221, and 222 to which the image forming apparatuses 230, 231, 232, and 233 belong, and can perform print processing. The first cloud print service (first CPS) 210 receives the print job from the client terminal 200, and transmits the print job to the second cloud print services (second CPSs) 220, 221, and 222. The first CPS 210 also receives print result logs transmitted from the image forming apparatuses 230, 231, 232, and 233 via the second CPSs 220, 221, and 222 corresponding to the respective image forming apparatuses. In the example illustrated in FIG. 2, the image forming apparatuses 230 and 231 are installed in a company, and are registered to a tenant (internal tenant) with which the company has made a contract in the CPS 220. The image forming apparatus 232 is installed in a shared office, and is registered to a tenant (shared office tenant) with which the shared office has made a contract in the CPS 221. The image forming apparatus 233 is installed in a convenience store, and is registered to a tenant (convenience store tenant) with which the convenience store has made a contract in the CPS 222.

The above-described components are communicably connected via a network. The network is, for example, any of the Internet, a local area network (LAN), a wide area network (WAN), a telephone line, a dedicated digital line, and an asynchronous transfer mode (ATM). Alternatively, the network is a communication network implemented by a combination thereof. The network may be any of a wired network and a wireless network as long as the network enables transmission/reception of data.

FIG. 3 is a block diagram illustrating a hardware configuration example of an image forming apparatus 3000 that is each of the image forming apparatuses 230 to 233 illustrated in FIG. 2, and a hardware configuration example of a cloud system (cloud server) 3010 that is the client terminal 200 or each of the CPSs 210, 220, 221, and 222.

A central processing unit (CPU) 3001 of the image forming apparatus 3000 totally controls processing units connected via a bus inside the image forming apparatus, and performs functions, such as a print function and a scan function. A read only memory (ROM) 3002 is a memory dedicated to data reading, and stores, for example, a basic control program of the image forming apparatus. A random access memory (RAM) 3003 is a data readable/writable memory, and is used as, for example, a working memory for the CPU 3001. A storage device 3004 is used as a storage area of temporary data during execution of each program, and persistent data. For example, a hard disk drive (HDD) is often used as the storage device 3004. Alternatively, the storage device 3004 may be a device that enables data reading/writing by being mounted with a solid state drive (SSD) or an external medium, such a compact disk (CD), a digital versatile disk (DVD), and a memory card. A communication apparatus 3005 communicates with another apparatus via a network, such as the Internet. An input device 3006 is an operation unit for receiving operation by the user. A display device 3007 is a device for displaying various kinds of screens, and is, for example, a liquid crystal display or a touch panel. The user can issue an instruction, via the input device 3006, on a user interface screen displayed on the display device 3007. A scanner device 3008 scans a document and generates an image.

A printer device 3009 performs a print job received from a CPS and performs print processing. In the present exemplary embodiment, the scanner device 3008 is not an essential component, and the image forming apparatus may not include the scanner device 3008.

The cloud system (cloud server) 3010 providing the client terminal 200 and the CPSs 210, 220, 221, and 222 includes a CPU 3011, a ROM 3012, a RAM 3013, a storage device 3014, a communication device 3015, an input device 3016, and a display device 3017. As the client terminal 200, a common information processing apparatus, such as a personal computer (PC) and a mobile terminal, can be used. Each of the cloud print services (CPSs) is implemented when a server system (computer) including one server or a plurality of servers executes predetermined programs.

Figure 4:
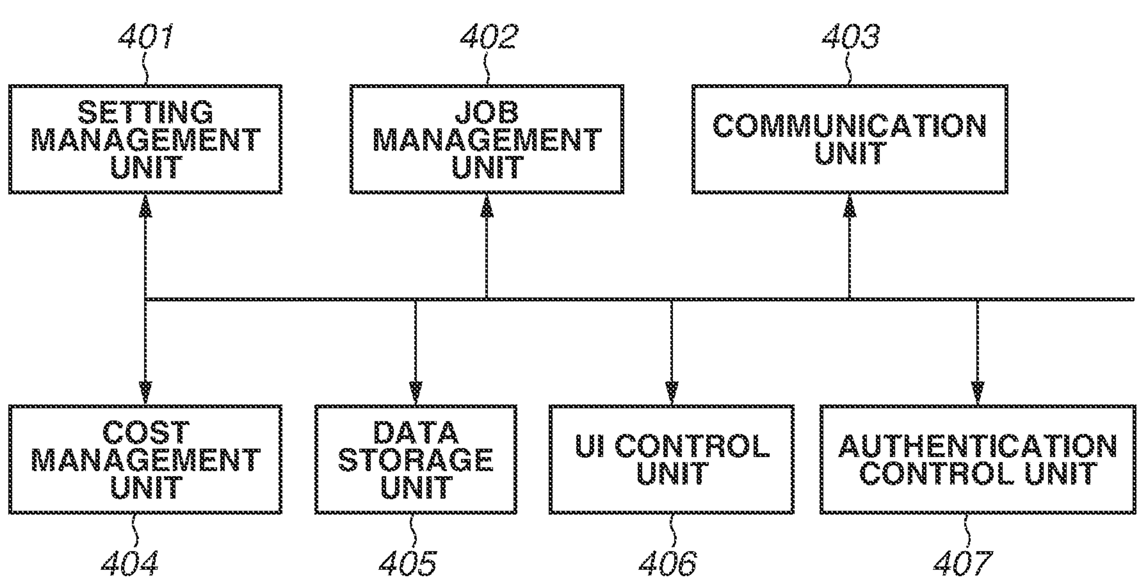
FIG. 4 is a software configuration diagram.

FIG. 4 is a block diagram illustrating a software configuration example of the CPS 210 according to the first exemplary embodiment. The software configuration illustrated in FIG. 4 is implemented by the CPU 3011 loading programs stored in, for example, the ROM 3012 into the RAM 3013 and executing the programs.

A setting management unit 401 stores settings relating to various kinds of functions of the CPS 210 in the storage devices, such as the RAM 3013 and the storage device 3014, and read the settings from the storage devices. A job management unit 402 stores the print job received from the client terminal 200 in a data storage unit 405. When receiving a print job acquisition request from any of the CPSs 220, 221, and 222, the CPS 210 acquires the requested print job from the data storage unit 405, and transmits the print job to the CPS having issued the acquisition request. A user interface (UI) control unit 406 controls a screen displayed on the display device 3017, and receives a user instruction from the input device 3016. An authentication control unit 407 performs login authentication of the user using the client terminal 200, and controls whether to permit login of the user.

FIG. 5 is a sequence diagram of processing relating to user registration to the CPS 210 and upload of a print job from the client terminal 200. The client terminal 200 includes a web browser 500, and can access a uniform resource locator (URL) of a web UI provided by the CPS 210, and can issue various kinds of instructions via the web browser 500. The setting management unit 401 of the CPS 210 also functions as a reception processing unit 501 and a virtual printer manager 502 described below. The job management unit 402 of the CPS 210 also functions as a print manager 503 described below.

In step 510, the client terminal 200 transmits a user registration request to the CPS 210 based on an instruction by the user, and the reception processing unit 501, which is implemented by the setting management unit 401 of the CPS 210, receives the user registration request. More specifically, when the user enters a URL of a registration reception page on the web browser 500 of the client terminal 200, the web browser 500 of the client terminal 200 transmits a request for accessing the registration reception page to the CPS 210. It is premised that the user has already obtained the URL of the registration reception page.

When receiving the user registration request from the client terminal 200 in step 510, in step 511, the reception processing unit 501 performs processing of transmitting a registration web UI (registration UI) to the web browser 500 of the client terminal 200 and causing the web browser 500 of the client terminal 200 to display the registration UI. In step 512, the web browser 500 of the client terminal 200 causes the user to input registration information (user information and information relating to work setting) on the displayed registration UI (registered user interface) (registration information setting processing).

FIG. 8 illustrates an example of the registration information input using the registration UI displayed on the web browser 500 of the client terminal 200. The registration information is roughly classified into two types of information.

One type of registration information is information relating to the user, and includes a login identification (ID) and a password for the CPS 210, and electronic settlement information (e.g., credit card information or equivalent thereto) used for charging processing. The credit card information of the user is used as a charging destination of printing in a case where the user instructs printing while setting "private use" as a work application.

Another type of registration information is information relating to a work setting. The work setting is making settings corresponding to a plurality of works performed by the user. A name of the work application, a charging destination, a print setting (default value), and the like are set to each work application. For example, an agreement that "a print document is to be output using a setting of double-sided printing and staple at upper left" may be made in Company A. In a case where such an agreement is made, it is necessary for the user to make such a print setting every time the user performs printing relating to a patent work of Company A. In contrast, in the present exemplary embodiment, as illustrated in FIG. 8, "Company A patent work" is set as the name of the work application, the charging destination is set to "Company A", and the default print setting is set to "double-sided and staple at upper left" in advance. When the setting is made in advance in this way, the user can specify the corresponding charging destination and the default print setting only by selecting "Company A patent work" as the work application at the time of printing. In the case of printing for private use, the charging destination is set to "user" for the work application of "private use".

In a case where the "user" is set as the charging destination, a credit card company of the user having instructed printing is charged based on the credit card information of the user.

In step 512, when the registration information setting processing on the registration UI is completed and the user presses a registration button on the registration UI, in step 513, the registration information designated on the registration UI is uploaded to the reception processing unit 501 (setting registration processing). In step 514, the reception processing unit 501 receives the information uploaded in step 513, and determines whether there is inconsistency, such as redundancy of the user login ID and validity of the credit card information, in the registration information based on the received information (registration information determination processing). In a case where there is no inconsistency in the registration information, in step 515, the reception processing unit 501 registers the user information and the work setting in FIG. 8, transmits a registration result indicating "registration permission" to the client terminal 200, and causes the web browser 500 of the client terminal 200 to display the registration result on the registration UI.

In contrast, in a case where there is inconsistency in the registration information, the reception processing unit 501 causes the web browser 500 of the client terminal 200 to display the registration result indicating "registration disapproval" on the registration UI, thereby prompting the user to perform reregistration operation. In a case where "registration permission" is displayed, information such as a personal identification number (PIN) code used for logging in to the image forming apparatuses 230 to 233 is displayed together. The PIN code in the present exemplary embodiment is a character string consisting of a plurality of alphanumeric characters (e.g., 9999) assigned and unique to each user.

In a case where the registration result is "registration permission" in step 514, in step 516, the reception processing unit 501 transmits a printer instance generation request to the setting management unit 401. The printer instance generation request is a request for generating a data area (virtual printer instance) dedicated to the user on the virtual printer manager 502 of the setting management unit 401. Information to be registered in the virtual printer instance is the information set in step 512, and a job upload UI described below is displayed based on the registered information. When receiving the printer instance generation request in step 516, in step 517, the virtual printer manager 502 generates the virtual printer instance and suspends (stands by) the processing.

Processing in steps 520 to 550 in FIG. 5 is processing for the user to log in to the CPS 210 from the client terminal 200 and to upload and store a print job with a desired setting to the server.

When the user enters a login URL in the web browser 500 of the client terminal 200, in step 520, the client terminal 200 transmits a login request to the CPS 210. In step 521, the client terminal 200 acquires a login screen from the CPS 210, and displays the login screen on the web browser 500 (login UI display processing). When the user sets the login ID and the password of the user and presses a login button (not illustrated) on the displayed login screen, in step 522, a login notification is transmitted to the virtual printer manager 502. When receiving the login notification, in step 530, the virtual printer manager 502 resumes (starts up) the virtual printer instance dedicated to the user corresponding to the login information. Then, in step 523, the virtual printer manager 502 transmits, to the client terminal 200, information relating to a web UI (job input UI) for selecting a file to be printed and inputting the file as a print job, thereby controlling the web browser 500 of the client terminal 200 to display the job input UI. In other words, the web browser 500 of the client terminal 200 displays the received job input UI on the screen.

Figure 9:
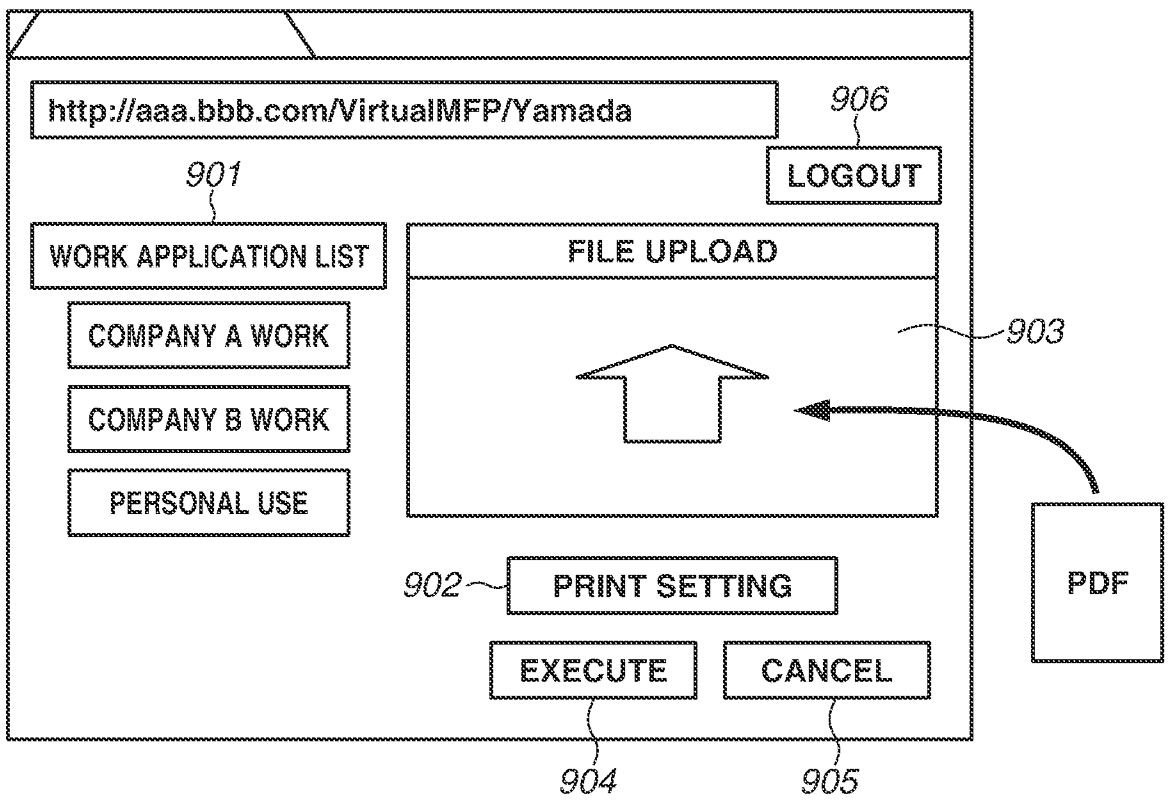
FIG. 9 illustrates a job input UI.

FIG. 9 illustrates an example of the job input UI. The job input UI includes a work application list 901 registered as the work setting by the user in step 512, and a print setting button 902 for displaying the print setting associated with a work application selected from the work application list 901. The job input UI further includes an upload UI 903 for selecting a file to be input (uploaded), an execution button 904, a cancel button 905, and a logout button 906.

User operations on the job input UI are described. The user selects an application of printing from the work application list 901. When the application is selected by the user, the default print setting associated with the selected application in FIG. 8 is applied. To change the default print setting, the user can press the print setting button 902 to display a print setting detail screen (not illustrated) and change the print setting. Further, when the user drags and drops a desired document file to be printed to the file upload UI 903, the file to be printed is specified. When the user presses the cancel button 905 at this time, a series of processes set up to the moment is canceled. On the other hand, in step 524, when the user selects the work application and the file to be printed and then presses the execution button 904, the web browser 500 of the client terminal 200 uploads the work application selected on the job input UI in FIG. 9, the print setting, and data on the file to be printed to the virtual printer manager 502 (job upload processing). In step 540, the virtual printer manager 502 specifies information on the charging destination and settlement information corresponding to the application based on the uploaded information relating to the application and the registration information in FIG. 8, and requests the print manager 503 to register the specified information, the data on the file to be printed, and the print setting as a print job (job registration request processing). In step 550, the print manager 503 stores job data on the print job generated based on the file to be printed and the print setting, and the information on the charging destination and the settlement information, in association with each other.

When the user presses the logout button 906 in FIG. 9 after the job upload processing in step 524 is finished, in step 525, the web browser 500 of the client terminal 200 notifies the virtual printer manager 502 of a logout request. When receiving the logout request, the virtual printer manager 502 performs virtual printer instance suspend processing, and in step 526, transmits a UI close request to the web browser 500 of the client terminal 200. As a result, the job input UI displayed on the web browser 500 is closed.

FIG. 6 illustrates a sequence including printing of the uploaded file, acquisition of usage history information (print log), and charge calculation, as processing after the file to be printed is uploaded from the client terminal 200 to the CPS 210. The job management unit 402 of the first CPS 210 functions as the print manager 503 in FIG. 6, and a cost management unit 404 of the first CPS 210 functions as a cost manager 601 in FIG. 6. A printer management tenant 602 in FIG. 6 includes the second CPSs 220, 221, and 222 (internal tenant, shared office tenant, and convenience store tenant). A printer 603 in FIG. 6 includes the image forming apparatuses 230, 231, 232, and 233, and each printer (image forming apparatus) 603 is registered to the corresponding printer management tenant 602. Note that it is premised that the first CPS 210 and the second CPSs 220 to 222 are already in conjunction with each other and in a state where a print job can be transmitted from the first CPS 210 to the second CPSs 220 to 222 and a print log can be transmitted from the second CPSs 220 to 222.

First, processing for registering the printer to the corresponding printer management tenant is described. In step 610, when an administrator of the printer management tenant 602 sets the printer management tenant 602 that is a registration destination on an operation panel of the printer to be registered, and presses a printer registration button, the printer transmits printer information (such as internet protocol (IP) address of printer), printer capability information (staple function, punch function, or other optional function), and the like to the printer management tenant 602 designated as the registration destination (printer information transmission processing). In step 611, the printer management tenant 602 that is the registration destination registers the received printer information in a database of the tenant, and returns a registration completion notification to the printer after completion of the registration. When receiving the registration completion notification, the printer displays a login screen on the operation panel of the printer. Note that, in the present exemplary embodiment, it is premised that application software for registration and login is preset in the printer.

Further, in the present exemplary embodiment, a configuration in which each printer management tenant 602 stores a charge table described below is described. In step 612, the printer management tenant 602 receives a charge table request from the cost manager 601, which is the cost management unit 404. In step 613, the printer management tenant 602 uploads the charge table managed by the printer management tenant 602 to the cost manager 601 (charge table upload processing). The cost manager 601 stores the received charge table of the printer management tenant 602 in the data storage unit 405. FIG. 7 illustrates an example of the charge table in which information received from printer management tenants are collected, and charges of the printer management tenants are managed. For example, in a case of using a tenant B (shared office tenant), a print unit price per one A4 sheet is 10 yen, 5 yen is added for a color page, and 10 yen is added for staple at one position.

Processing in and after step 620 in FIG. 6 is processing performed in a case where print processing is performed using any of the image forming apparatuses 230 to 233. As a specific example, a case where the user performs printing by using the image forming apparatus 232 registered to the CPS (shared office tenant) 221 is described.

When the user enters the PIN code acquired in step 515 to the printer 603 (image forming apparatus 232), in step 620, the printer 603 notifies the printer management tenant 602 of the PIN code (PIN code notification processing). In step 621, the printer management tenant 602 transmits, as a job list request, an instruction for acquiring a job list based on the received PIN code to the print manager 503. In step 622, the print manager 503 acquires the job list of jobs associated with the PIN code among the job data stored in the job management unit 402. FIG. 10 illustrates an example of the job list that includes a work application, job information (job name to be displayed, print setting, etc.), and a job size associated with the PIN code. Since the PIN code is assigned to each user, the job list of jobs associated with the user who is logged in to the printer and performing operation is acquired. A job ID in FIG. 10 is information set in step 634 described below.

In steps 623 and 624, the acquired job list is transmitted to the printer 603 that has transmitted the PIN code in step 620, via the printer management tenant 602 (job list transmission processing), and is displayed as a job list on the operation panel of the printer. In steps 630 and 631, when the user selects a desired job from the job list displayed on the operation panel of the printer, and then presses a print button, a request for printing the selected job is notified to the print manager 503 via the printer management tenant 602 (print request processing).

In step 632, the print manager 503 acquires the job requested to be printed from the job management unit 402, and assigns a unique job ID to the acquired job. In step 633, the print manager 503 transmits the job having been assigned the job ID to the cost manager 601. In step 634, the cost manager 601 stores the job ID of the job. Then, in steps 635 and 636, the cost manager 601 transmits the job to the printer 603 (e.g., image forming apparatus 232) via the printer management tenant 602. In step 637, the printer 603 performs print processing using the received job. Further, in step 637, the printer 603 stores information about a print result as a print log. As the print log, the job ID, the number of sheets used for printing, color information (color or monochrome), and the like are stored for each job.

When printing is completed and the user logs out from the printer 603 (e.g., image forming apparatus 232) based on operation by the user (or printer 603 detects printing completion and automatically performs logout), in steps 640 and 641, the printer 603 notifies the cost manager 601 of a logout notification via the printer management tenant 602. When receiving the logout notification, in step 642, the cost manager 601 transmits a usage history request to the printer 603 (image forming apparatus 232). When receiving the usage history request in step 642, in step 643, the printer 603 (image forming apparatus 232) returns the print log (usage history information). FIG. 14 illustrates an example of the acquired print log.

In step 650, the job ID stored in step 634 and the job ID in the print log acquired in step 643 are collated, information relating to the printed job (information on application and charging destination) is acquired, and charge information is calculated. A specific example is described. The job list in which the PIN code and the job ID are associated with each other in FIG. 10 is collated with the job ID in the acquired print log in FIG. 14. As a result, a job having a coincident job ID "JobID-100991" is determined to be the printed job, and the work application associated with the job is specified. In addition, the charge table of the printer management tenant 602 (tenant to which printer having performed printing is registered) for the job is acquired from the charge table in FIG. 7.

For example, in a case where printing is performed using the image forming apparatus 232 registered to the shared office tenant, a charge is calculated with reference to the charge table of the tenant B, which is the shared office tenant.

For example, a cost required for printing the job having the job ID "JobID-100991" is calculated as follows:

$$75\ (\text{pages})\times 10\ (\text{yen}:A4)+10\ (\text{yen}:\text{staple})=760\ \text{yen}.$$

In addition, a usage fee of the first CPS 210 is also charged. FIG. 15 illustrates an example of the usage fee of the CPS 210, and the usage fee is charged based on job data size. In the job list in FIG. 10, the data size of the job having the job ID "JobID-100991" is 100 M. Therefore, the usage fee of the cloud print service is 20 yen. In addition, based on the specified work application and the registration information relating to the work setting in FIG. 8, the charging destination is determined to be Company A.

In a case where the application of printing is private use, the charging destination is determined to be the user, and the settlement means is determined to be credit card settlement based on the settlement information (credit card information) on the user in FIG. 8. Therefore, in the case of the printing for private use, the charging destination is a credit card company corresponding to the settlement information of the user.

When the charging destination and the charge are determined in step 650, in step 660, the cost manager 601 performs charging processing on a corresponding charging destination 606. For example, in the case of the above-described job having the job ID "JobID-100991", a total charge of 780 yen calculated by adding the print cost of 760 yen for the tenant B and the usage fee of 20 yen for the CPS 210 is charged to Company A that is the charging destination associated with the application. The charging destination 606 may be a terminal in Company A receiving the charging to Company A, a credit card company receiving the charging to Company A, or the like.

In step 661, when settlement processing of the above-described amount charged is performed, information indicating that payment is made is transmitted to the cost manager 601 from Company A, which is the charging destination 606. Thereafter, the job information on the job is deleted from the job management unit 402 in response to an instruction by the print manager 503.

Further, the charge settled in step 661 is distributed to a printer provider 604 and a provider 605 of the CPS 210. The printer provider 604 is a company, a shared office, a convenience store, or the like providing the printer 603. More specifically, in step 670, the cost manager 601 performs processing (transfer processing) for paying a distributed charge to the printer provider 604 using a bank account of the printer provider 604 or the like. The transfer processing for the printer provider 604 may be performed via the printer management tenant 602 used by the printer provider 604. In step 671, the cost manager 601 performs processing (transfer processing) for paying the usage fee to the provider 605 of the CPS 210 using a bank account of the CPS provider 605 or the like. In the above-described example, 760 yen and 20 yen are respectively paid in steps 670 and 671.

According to the above-described first exemplary embodiment, the plurality of print applications and the charging destinations corresponding to the respective applications can be individually registered. Therefore, even in a case where the user belongs to a plurality of companies and performs the corresponding works, the user can pay the charge to the appropriate charging destination.

Further, in a case where a plurality of different image forming apparatuses is used, the cost based on a print charge in each of the image forming apparatuses can be easily calculated.

In the first exemplary embodiment, the user is charged in the case where the print application is private use. Thus, registration of electronic settlement information (credit card information) of the user is necessary as the registration information in the user registration flow. On the other hand, there is a case where the user does not have a credit card.

Thus, in a second exemplary embodiment, registration of the user to the CPS 210 is permitted without credit card information. In addition, when the user operates the printer and performs printing, if settlement means other than electronic settlement (e.g., cash settlement) is possible, settlement using the settlement means is allowed. In the following description, the configuration and processing not particularly specified are similar to the configuration and the processing in the first exemplary embodiment.

In the first exemplary embodiment, in step 511 in FIG. 5, the user is required to input the credit card information as the settlement information of the user as illustrated in FIG. 8. In contrast, in the second exemplary embodiment, in step 511 in FIG. 5, a registration UI for registering registration information as illustrated in FIG. 11 is displayed. In other words, in the registration UI, registration of credit card information as the settlement information of the user is selectable. In a case where a checkbox to "register credit card information" is checked, the credit card information of the user can be registered. On the other hand, in a case where the checkbox is unchecked, the user can be registered without credit card information. Setting of the login ID and the password in the user information registration is similar to the setting in the first exemplary embodiment. In addition, the work setting is similar to the work setting in the first exemplary embodiment. Therefore, detailed description thereof is omitted.

FIG. 16 illustrates a charge table according to the second exemplary embodiment that includes information on a charge acquisition means (information relating to a settlement method, such as cash settlement and electronic settlement) in addition to information on the print charge, for each printer management tenant 602.

In FIG. 6, when receiving the charge table request in step 612, the printer management tenant 602 uploads the charge table managed by the printer management tenant 602 to the cost manager 601. The uploaded information includes the information on the charge acquisition means. As illustrated in FIG. 16, the cost manager 601 stores the charge table for each printer management tenant 602 in the data storage unit 405.

In the following description, processing in a case where the user performs printing by using the image forming apparatus 233 installed in a convenience store is described with reference to the processing in and after step 620 in FIG. 6.

When the user enters the PIN code acquired in step 515 to the image forming apparatus 233, in step 620, the image forming apparatus 233 notifies the printer management tenant 602 of the PIN code. In step 621, the printer management tenant 602 notifies the print manager 503 of an instruction to acquire a job list based on the received PIN code together with the PIN code and printer management tenant information.

In step 622, the print manager 503 acquires the job list of jobs associated with the PIN code from the job data stored in the job management unit 402. FIG. 17 illustrates an example of the job list acquired in step 622. Printing propriety determination processing described below is performed on each of the jobs in the acquired job list.

Figure 12:
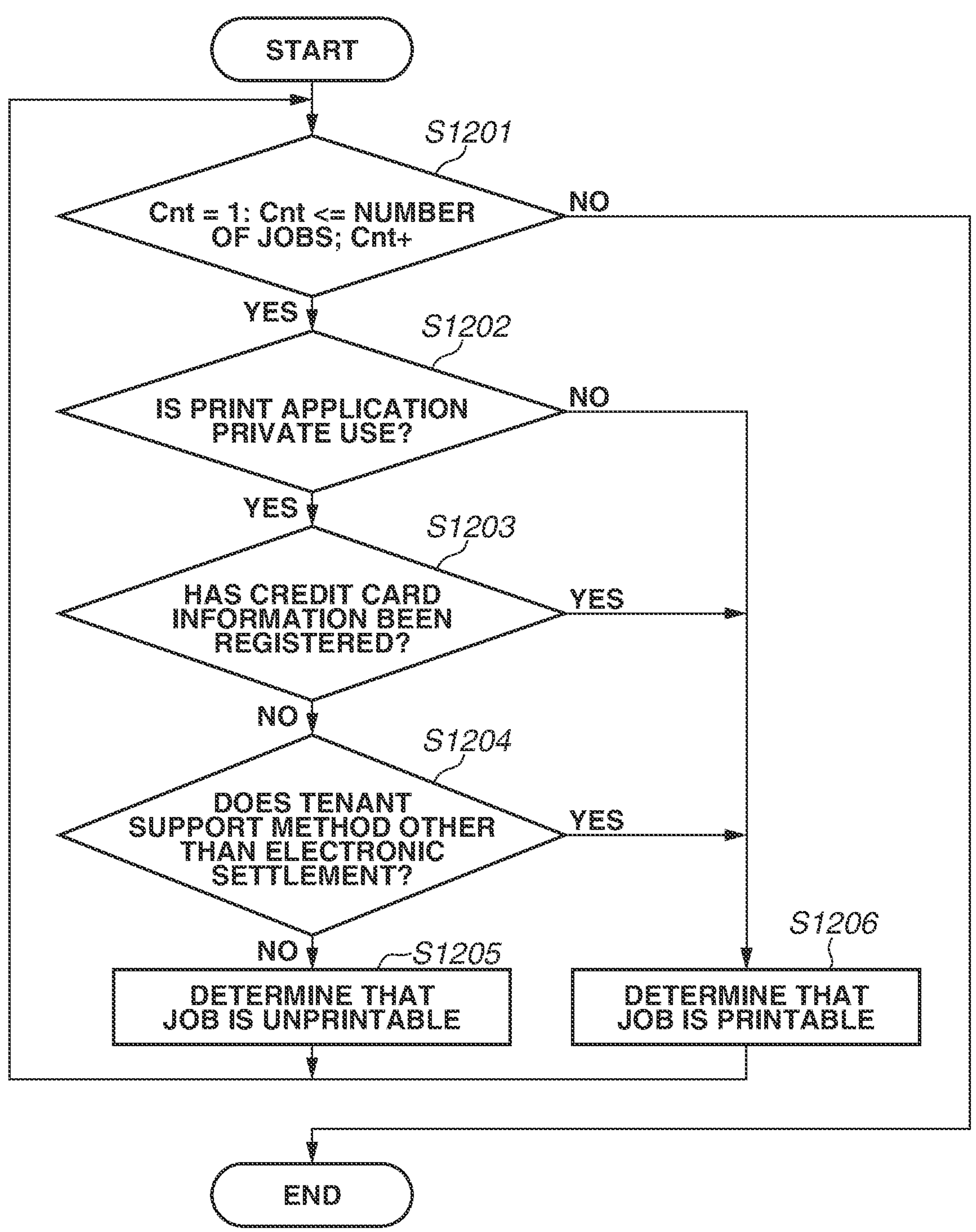
FIG. 12 is a flowchart illustrating a flow of determining printing propriety.

FIG. 12 is a flowchart illustrating details of a flow of determining printing propriety based on presence/absence of the credit card information. In the following description, a case where the printer management tenant 602 to which the image forming apparatus 233 operated by the user is registered is a tenant C (convenience store tenant) in FIG. 16, and the job list acquired in step 622 is the job list illustrated in FIG. 17 is described as an example. Values set in a job ID field and a determination field in FIG. 17 are set in a step described below.

In step S1201, loop processing for performing processing in steps S1202 to S1206 described below is performed on the jobs included in the job list in FIG. 17 while the jobs are handled as determination objects in order.

In step S1202, it is determined whether the print application of a job that is the determination object is private use based on the information described in the job list in FIG. 17. In a case where the print application is private use (YES in step S1202), the user is charged, and the processing proceeds to step S1203. Otherwise (NO in step S1202), the company or the like is charged. Therefore, it is determined that charging is possible (electronic settlement is possible), and the processing proceeds to step S1206.

In step S1203, it is determined whether the credit card information has been registered as the settlement information of the user. In a case where the credit card information of the user has been registered as the settlement information of the user in FIG. 11 (YES in step S1203), the processing proceeds to step S1206. In a case where the credit card information has not been registered (NO in step S1203), the processing proceeds to step S1204.

In step S1204, it is determined whether the printer management tenant 602 (e.g., tenant C) to which the image forming apparatus operated by the user is registered supports a method other than the electronic settlement based on the information on the charge acquisition means in the charge table in FIG. 16. In a case where the printer management tenant 602 supports a method other than the electronic settlement (YES in step S1204), the processing proceeds to step S1206. In a case where the printer management tenant 602 does not support a method other than the electronic settlement (NO in step S1204), the processing proceeds to step S1205. In step S1205, the job is determined to be unprintable.

For example, in a case where the print application is "private use" and the credit card information is "not registered" as the settlement information of the user, if the printer management tenant 602 (tenant C) to which the image forming apparatus is registered supports a method other than the electronic settlement (cash settlement), the processing proceeds to step S1206. In step S1206, the job is determined to be printable, and "printable" is set in the determination field in FIG. 17. In a case where the processing proceeds to step S1205, "unprintable" is set in the determination field in FIG. 17.

After the printing propriety is determined by the flow of determining the printing propriety in FIG. 12, in steps 623 and 624, the information on the job determined to be printable is transmitted to the printer via the printer management tenant 602, and is displayed on the operation panel of the printer. In steps 630 and 631, when the user selects a desired job from the job list displayed on the operation panel of the printer, and then presses the print button, a request for printing the selected job is notified to the print manager 503 via the printer management tenant 602 (print request processing).

<Charge and Settled Charge Distribution Flow>

A specific example of the charging processing according to the second exemplary embodiment is described. The job list in which the PIN code and the job ID are associated with each other as illustrated in FIG. 17 is collated with the job ID in the acquired print log in FIG. 14. As a result, the job having the coincident job ID "JobID-199906" is determined to be the printed job. The charge table of the printer management tenant 602 (tenant performing printing) is acquired for the job from the charge table in FIG. 16. In the above-described specific example, the printer management tenant 602 is the tenant C. Therefore, the cost required for printing is calculated as follows: 3 (3 pages)×10 (yen: A4)+10 (yen: color)=40 yen. Further, since the data size is 10 M, the usage fee of the CPS 210 is 10 yen based on FIG. 15. In addition, the print application of the job list in FIG. 17 is "private use". Thus, the charging destination is the user. The credit card information is not registered as the settlement information of the user. Thus, the payment method is cash settlement (e.g., settlement at cash register of convenience store).

Figure 13:
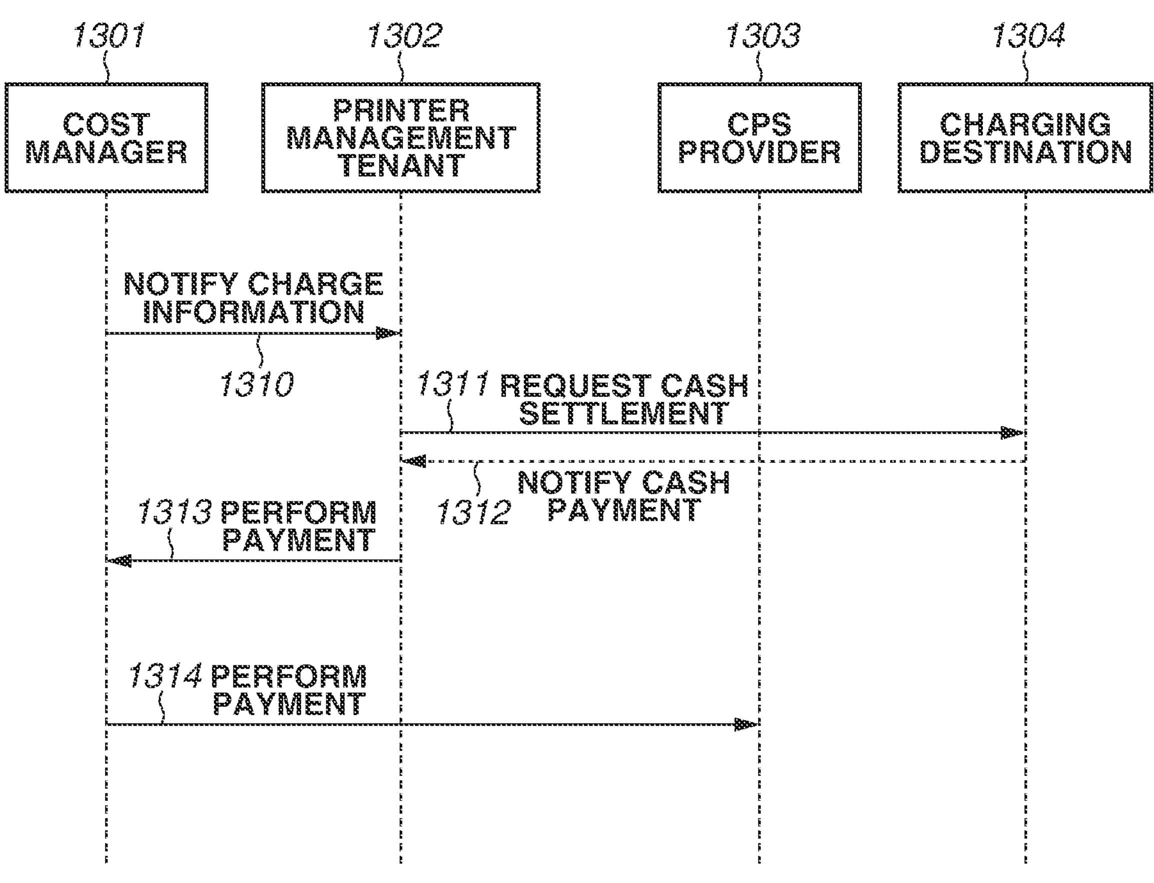
FIG. 13 is a sequence diagram relating to charging processing.

FIG. 13 is a sequence diagram in which the processing in and after step 660 in FIG. 6 is replaced with processing in the case where the print application is "private use" and the credit card information of the user is not registered. Since the print application is private use, a charging destination 1304 is the user.

In step 1310, upon determining a charge and a payment method (cash settlement), a cost manager 1301 notifies a printer management tenant 1302 of the information as charge information. The printer management tenant 1302 requests the charging destination (user) 1304 to perform cash settlement. For example, the printer management tenant 1302 displays a message prompting the user to output a sheet on which a barcode for cash settlement is printed from the image forming apparatus 233 operated by the user, and to perform settlement at a cash register of the convenience store. In the case of the above-described specific example, 40 yen is charged. When the user performs the cash settlement at the cash register of the convenience store, in step 1312, information indicating that the cash settlement has been performed is notified from the cash register of the convenience store to the printer management tenant 1302. In the case of the above-described specific example, when 40 yen is paid by the user, the printer management tenant 1302 (printer provider) receives 30 yen as a device providing charge. In addition, it is necessary to pay a difference (10 yen in the case of above-described specific example) calculated by subtracting the device providing charge from the settled charge, to a CPS provider 1303. Thus, in step 1313, the printer management tenant 1302 pays the difference to the cost manager 1301. In step 1314, the cost manager 1301 pays the difference to a bank account or the like of the CPS provider 1303.

In FIG. 13 described above, a case where the print application is private use, the credit card information of the user is not registered, the printing is performed on the image forming apparatus installed in the convenience store, and the charge is paid at the cash register after the printing ends is assumed; however, the charge may be prepaid. For example, a coin vender (charging apparatus) may be connected to the image forming apparatus 233, a charge (charge information) required for printing the file to be printed is calculated before execution of the printing, and the user is prompted to feed cash into the coin vender. Then, before the printing is performed in step 637 in FIG. 6, it is determined whether the charge has been fed into the coin vender. In a case where it is determined that the charge has been fed into the coin vender, the printing is executed. In this case, in step 1311, cash settlement is requested while the coin vender (or image forming apparatus connected to coin vender) is selected as the charging destination 1304 in FIG. 13. Then, in step 1312, the coin vender (or image forming apparatus) performs settlement by subtracting the charge from the fed cash, and transmits information indicating that payment is made to the printer management tenant 1302.

According to the second exemplary embodiment, even a user who does not have a credit card can print a file by using the image forming apparatus that supports cash settlement.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-044873, filed Mar. 22, 2023, which is hereby incorporated by reference herein in its entirety.

What is claimed is:

1. A server system comprising:

one or more memories that store instructions; and one or more processors that execute the instructions to:

perform registration processing for registering names of a plurality of applications and charging destinations of the applications designated in a client terminal in association with each other;

transmit, to the client terminal, information about a first user interface for prompting a user to select a name of an application of a file to be printed among the registered names of the plurality of applications;

receive the name of the application selected on the first user interface and the file to be printed from the client terminal; and perform charging processing to a charging destination registered in association with the received name of the application based on printing of the file to be printed, wherein the one or more processors further execute the instructions to transmit, to the client terminal, information about a second user interface for prompting the user to designate the names of the plurality of applications and the charging destinations of the applications on the client terminal, and wherein, in the registration processing, the names of the plurality of applications and the charging destinations of the applications designated using the second user interface on the client terminal are registered in association with each other.

2. The server system according to claim 1, wherein the one or more processors further execute the instructions to:

store the received file to be printed; and transmit, to an image forming apparatus, a file requested to be printed by the image forming apparatus among stored files to be printed, and wherein the charging processing is performed to the charging destination registered in association with the received name of the application after the transmitted file has been printed by the image forming apparatus.

3. The server system according to claim 2, wherein a charge charged to the charging destination in the charging processing includes a charge relating to printing by the image forming apparatus and a usage fee of the server system.

4. The server system according to claim 3, wherein the one or more processors further execute the instructions to, after the charging processing to the charging destination is finished, distribute the charge paid in the charging processing to a provider of the image forming apparatus and a provider of the server system.

5. The server system according to claim 1, wherein, in the registration processing, the names of the plurality of applications, the charging destinations of the applications, and default print settings of the applications are registered in association with each other based on designation from the client terminal, wherein the first user interface includes a list for prompting the user to select the name of the application of the file to be printed among the registered names of the plurality of applications, and a print setting set to the file to be printed, and wherein the one or more processors further execute the instructions to, when the name of the application of the file to be printed is selected from the list on the first user interface displayed on the client terminal, reflect a default print setting registered in association with the selected name of the application.

6. The server system according to claim 1, wherein, in the registration processing, settlement information on the user is further registered, and wherein, in the charging processing, in a case where the received name of the application is private use, the charging processing is performed based on the registered settlement information on the user.

7. A non-transitory computer-readable storage medium that stores instructions, wherein the instructions cause at least one processor to:

perform registration processing for registering names of a plurality of applications and charging destinations of the applications designated in a client terminal in association with each other;

transmit, to the client terminal, information about a first user interface for prompting a user to select a name of an application of a file to be printed among the registered names of the plurality of applications;

receive the name of the application selected on the first user interface and the file to be printed from the client terminal; and perform charging processing to a charging destination registered in association with the received name of the application based on printing of the file to be printed, wherein the instructions further cause the at least one processor to transmit, to the client terminal, information about a second user interface for prompting the user to designate the names of the plurality of applications and the charging destinations of the applications on the client terminal, and wherein, in the registration processing, the names of the plurality of applications and the charging destinations of the applications designated using the second user interface on the client terminal are registered in association with each other.

8. The non-transitory computer-readable storage medium according to claim 7, wherein the instructions further cause the at least one processor to:

store the received file to be printed; and transmit, to an image forming apparatus, a file requested to be printed by the image forming apparatus among stored files to be printed, and wherein the charging processing is performed to the charging destination registered in association with the received name of the application after the transmitted file has been printed by the image forming apparatus.

9. The non-transitory computer-readable storage medium according to claim 8, wherein a charge charged to the charging destination in the charging processing includes a charge relating to printing by the image forming apparatus and a usage fee of the server system.

10. The non-transitory computer-readable storage medium according to claim 9, wherein the instructions further cause the at least one processor to, after the charging processing to the charging destination is finished, distribute the charge paid in the charging processing to a provider of the image forming apparatus and a provider of the server system.

11. The non-transitory computer-readable storage medium according to claim 7, wherein, in the registration processing, the names of the plurality of applications, the charging destinations of the applications, and default print settings of the applications are registered in association with each other based on designation from the client terminal, wherein the first user interface includes a list for prompting the user to select the name of the application of the file to be printed among the registered names of the plurality of applications, and a print setting set to the file to be printed, and wherein the instructions further cause the at least one processor to, when the name of the application of the file to be printed is selected from the list on the first user interface displayed on the client terminal, reflect a default print setting registered in association with the selected name of the application.

12. The non-transitory computer-readable storage medium according to claim 7, wherein, in the registration processing, settlement information on the user is further registered, and wherein, in the charging processing, in a case where the received name of the application is private use, the charging processing is performed based on the registered settlement information on the user.

13. A method of controlling a server, the method comprising:

registering names of a plurality of applications and charging destinations of the applications designated in a client terminal in association with each other;

transmitting, to the client terminal, information about a first user interface for prompting a user to select a name of an application of a file to be printed among the registered names of the plurality of applications;

receiving the name of the application selected on the first user interface and the file to be printed from the client terminal; and performing charging processing to a charging destination registered in association with the received name of the application based on printing of the file to be printed, wherein the instructions further cause the at least one processor to transmit, to the client terminal, information about a second user interface for prompting the user to designate the names of the plurality of applications and the charging destinations of the applications on the client terminal, and wherein, in the registration processing, the names of the plurality of applications and the charging destinations of the applications designated using the second user interface on the client terminal are registered in association with each other.

* * * * *